July 25, 1961  A. L. M. A. ROUY  2,993,404
APPARATUS FOR MEASURING MINUTE ANGULAR DEFLECTIONS
Filed Oct. 15, 1957  2 Sheets-Sheet 1

AUGUSTE LOUIS MARIE ANTOINE ROUY
INVENTOR.

BY
*Rudolph J. Junick*
ATTORNEY

July 25, 1961  A. L. M. A. ROUY  2,993,404
APPARATUS FOR MEASURING MINUTE ANGULAR DEFLECTIONS
Filed Oct. 15, 1957  2 Sheets-Sheet 2

AUGUSTE LOUIS MARIE ANTOINE ROUY
INVENTOR.

BY Rudolph J. Gunick
ATTORNEY

United States Patent Office 2,993,404
Patented July 25, 1961

2,993,404
APPARATUS FOR MEASURING MINUTE
ANGULAR DEFLECTIONS
Auguste Louis Marie Antoine Rouy, Scarsdale, N.Y., assignor, by mesne assignments, to Daystrom, Incorporated, Murray Hill, N.J., a corporation of New Jersey
Filed Oct. 15, 1957, Ser. No. 690,269
12 Claims. (Cl. 88—14)

This invention relates to a method and apparatus for measuring minute angular deflections with extremely high precision.

While the present invention is adapted for general application in the field of physical measurements, it is particularly useful in the field of polarimetry wherein the measurement of the optical rotary power of a solution is to be measured with extremely high precision.

In my co-pending United States patent application, Serial No. 690,395 filed October 15, 1957, and entitled Apparatus and Method for Polarimetric Analysis I disclose novel methods and apparatus for measuring the extent of the plane of polarization of rotation of a polarized light beam traversing a solution. Briefly, prior to entering the solution, the polarized light beam is modulated continuously within an angular range defined by known and opposite angles with respect to a fixed reference plane. The light beam emerging from the substance is passed through a light-polarizing member, or analyzer, and converted into corresponding electrical variation by means of a suitable light transducer. Because of the modulated character of the light beam, the output of the light transducer includes both A.C. and D.C. components. By means of suitable arrangements the D.C. component, which is proportional to the sum of the light energies, is measured in absolute value and the A.C. component, which is proportional to the difference of the light energies, is either balanced out or measured. When measured, the ratio of the A.C. to the D.C. components is related to the optical rotary power of the solution. When balanced out, the A.C. component serves as a means for providing a physical measure of such optical rotary power. Although such latter method results in extremely high sensitivity, even without the use of amplifying means for the electrical variations, the actual physical measurement of an angular displacement is a limitation on the full utilization of the sensitivity and range inherent in the disclosed method.

The invention disclosed herein provides a means whereby extreme sensitivity in angle measurements can be obtained well beyond the accepted standards.

An object of this invention is the provision of an arrangement for the measurement of small angular deflections which arrangement affords a degree of sensitivity and accuracy heretofore unobtainable.

An object of this invention is the provision of apparatus for measuring the angular rotation of a rotatable member comprising a light interferometer having a pair of light permeable plates spaced apart along the axis of a light beam, a support carrying one of the plates, means securing the support to the rotatable member, and means for adjusting the planar orientation of the two plates when the rotatable member is in a predetermined position.

An object of this invention is the provision of apparatus for measuring the extent of angular rotation of a rotatable member comprising a light interferometer including two light-permeable plates spaced a predetermined distance apart along the axis of a light beam, a support consisting of a rigid base portion and an extending arm integrally joined by a pressure-deformable intermediate portion, manually-operable means adjustable to deform the said pressure-deformable intermediate portion of the support to thereby change the angular position of one plate relative to the other plate, and means for securing the support to the rotatable member such that the axis of rotation of the rotatable member is normal to the axis of said light beam.

An object of this invention is the provision of apparatus of the type disclosed wherein light-interference bands are viewed on a reticle carrying reference markings and including a set of calibrated markings viewable simultaneously with the reticle markings, and means for projecting an image on the said calibrated markings, said image being movable along said calibrated markings in correspondence with a variable condition.

These and other objects and advantages will become apparent from the following description when taken with the accompanying drawings. It will be understood, however, that the drawings are for purposes of illustration and are not to be construed as defining the scope or limits of the invention, reference being had for the latter purpose to the claims appended hereto.

In the drawings wherein like reference characters denote like parts in the several views.

In the present invention, the phenomenon of light interference patterns, produced by vectorial addition of the oscillation amplitude of two different beams of the same wavelength, is utilized. Such interference patterns normally are used in the optical industry to control optical surfaces and they also constitute the basic principle of the Michelson interferometer and of the Pulfrick interferometer. By an adaptation of both types of interferometer, together with the addition of novel and simple means, I provide an arrangement affording extreme sensitivity in angle measurement, well beyond that available with existing apparatus and arrangements.

Figure 1:
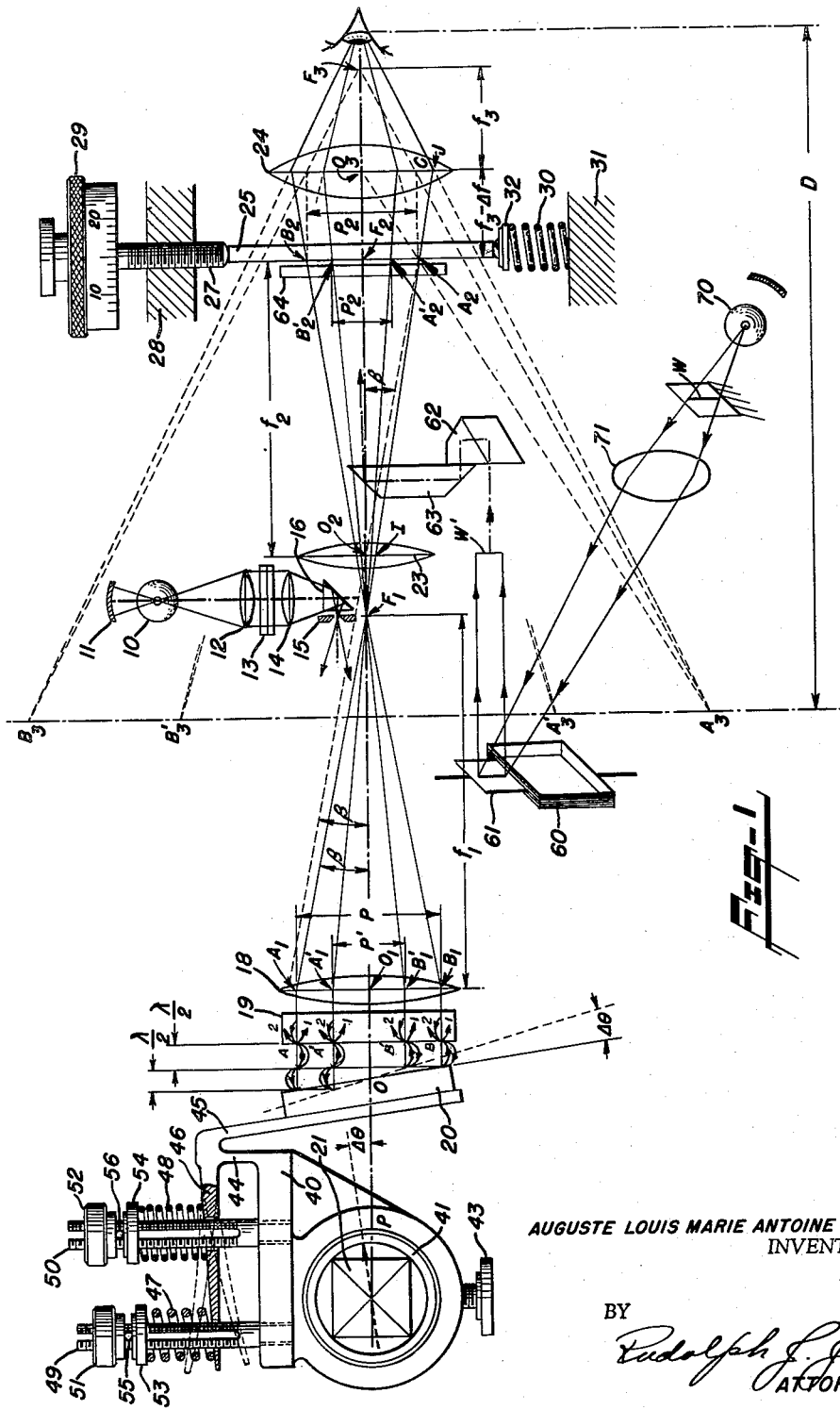
FIGURE 1 is a diagrammatic representation showing an angle measuring arrangement made in accordance with my invention.

Reference is now specifically made to FIGURE 1 which is a diagrammatic representation of my novel arrangement. A monochromatic light source 10, located at the center of curvature of a spherical mirror 11, produces a light flux collected by the entrance lens 12 of a condenser unit. The entrance lens 12 transforms the entering, divergent beam into a practically parallel beam which, after traversing the monochromatic filter 13, penetrates the second lens 14 of the condenser. The light beam converges to form the image of the light source in the plane of a screen 15 carrying a very small circular opening, a small total-reflection prism 16 serving to bend the axis of the light beam at a right angle from its initial direction. The prism 16 and the screen 15 are located very close to the general optical axis of the main instrument and in such a manner that the circular opening of the screen 15 is spaced at a distance from the front objective 18 equal to the objective focal length $f_1$. The opening of the screen acts as a punctual light source at the focal point of the objective 18 which transforms the diverging beam into a parallel or collimated light beam. The parallel light rays emerge from the objective 18 and enter a plane parallel, light-permeable plate 19. At the emergence surface of the said plate, part of the light is reflected backward without phase shift as indicated by the arrow 1. The emerging light travels further until it impinges on the plane surface of another light-permeable plate 20 which is centered on the main optical axis of the instrument and which is carried by the assembly mechanically coupled to the light-polarizing member 21.

At the light-impinging surface of the plate 20, part of the light beam is reflected with a 180 degree phase shift and retraces its initial route until it encounters the emergence surface of the plate 19. At that point both vibration amplitudes, the original one without phase shift and the subsequent one with the 180° phase shift, form a vectorial resulting sum. An extinction of the light occurs, therefore, giving rise to an interference band, when the air distance between the two surfaces is equal to a multiple of half the wave length of the monochromatic light. In the case of a mercury green line of 5461 Angstroms, the half wave lengths become 0.00027305 millimeters. As described, the interferometer arrangement is well known and produces good interference bands suitable for most optical measurement. However, for adaptation to the present invention, where high resolving power must be attained, the sharpness of the interference band must be enchanced. An increase of the constrast ratio between illuminated and dark zones and a decrease of the interference band width will improve considerably the resolving power, that is, the geometric definition of the interference pattern. Toward this end I provide the following improvements.

First, all non-interfering light reflected toward the objective 18 must be eliminated. For that purpose the entrance surface of the plane parallel plate 19, that is, that surface proximate to the objective 18, is tilted by an angle of some 10 to 15 minutes with respect to the exit surface and is given a quarter wave length anti-reflection coating. Also, the glass plate 20 acting as a partial reflecting mirror is made of black glass which thus absorbs all the light entering it and prevents a secondary reflection at its back surface.

Second, the light-reflecting surfaces of the plates 19 and 20 receive a mirror coating of such quality that it reflects approximately 50 percent of the light energy impinging on those surfaces.

Needless to say that the geometric quality of the flat reflecting surfaces of the plates 19 and 20 reaches beyond one hundredths of a selected wave length. Such surfaces should not be the result of retouching or figuring but must be achieved by the technique of true generation. This last process yields surfaces of high purity otherwise impossible to obtain with local figuring.

As an added safety precaution, optical fused quartz is preferred for the plate 19. The plate 20 may also be made of optical fused quartz cemented on top of a thin plate of fused silica black glass. The choice of quartz eliminates the problem of the thermal expansion causing appreciable deformation of the reflecting surfaces.

With these precautions, the light interference bands become extremely sharp and their central portion approximates perfect blackness. Their degree of sharpness depends also upon the monochromaticity of the light source and in this respect a mercury isotope arc lamp source is preferred to the ordinary mercury arc lamp. Good practice calls for a single line emission light source and discards the multiple lines which impose considerable restriction on the practical air space between the two reflecting surfaces.

The beam of parallel rays reflected by the surfaces 20 and 19 re-enters the objectives 18 and converges at its focal point $F_1$. From this objective focal point the beam continues traveling, while diverging, and enters the objective 23 of a telescope whose ocular lens system 24 is adjusted for observation at infinity or near it. The said telescope includes a micrometric adjustable reticle 25 located at or near the ocular focal plane, which ocular 24 is of the positive and wide angle type.

Figure 2:
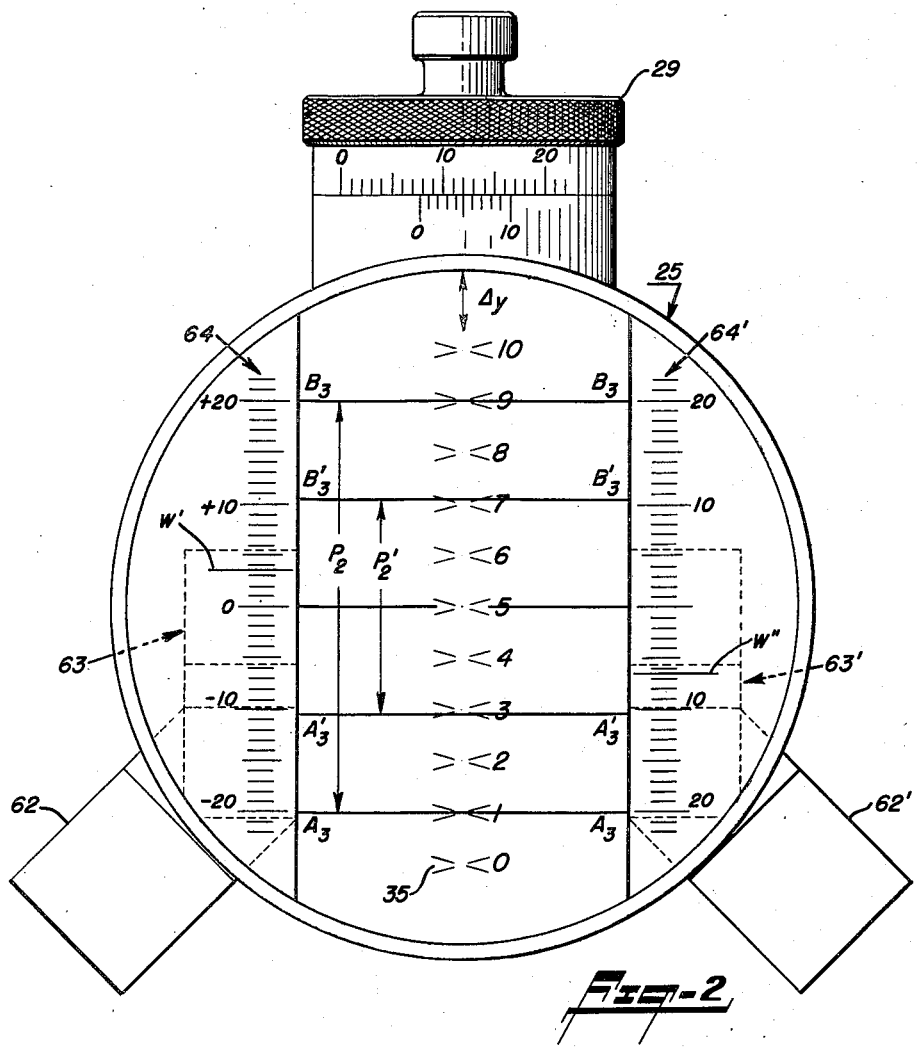
FIGURE 2 is an enlarged view of the telescope reticle carrying certain sets of markings for purposes of this invention.

A transparent glass plate carrying appropriate markings and reference lines, as shown in FIGURE 2, on its surface facing the objective 23 constitutes the reticle 25. This reticle is movable in a plane perpendicular to the general optical axis of the instrument. A micrometric screw 27 cooperating with a mating nut 28 and carrying a graduated drum 29 causes, through rotation, the linear displacement of the reticle. Such arrangement permits accurate measurements of such reticle displacements through the use of the precision scale engraved on the drum and the vernier facing it. A coil spring 30, resting against the firm wall surface 31 of the instrument, presses, through a pressure cap 32 or similar arrangement, the reticle 25 against the micrometic screw end and thus prevents back lash in the mechanism.

The light rays, in their progression toward the observer's eye located at the exit pupil of the instrument, pass through the transparent reticle plate 25 and enter the ocular 24. As these rays emerge from the said ocular they converge to a point on the optical axis and close to the image focal point $F_3$ of the positive ocular.

The eye, placed at the exit pupil, observes an enlarged image $A_3$, $A'_3$, $B'_3$, $B_3$ of the fringe pattern A, A', B', B formed at the half mirrored surface of the plate 19. The eye also sees, superposed thereon, the enlarged image of the markings on the reticle 25.

The geometry involved in the imagery presents no difficulty; one complete light ray tracing being indicated in FIGURE 1. The light ray $A_1$, $F_1$, I, originating at the point of interference A on the plate 19, penetrates the objective 23 making an angle $\beta$ with respect to the general optical axis just as if the ray was emitted by a point source located at infinity and at an angular displacement $\beta$ from the general axis. Thus, the correspondingly refracted ray $IA_2$ intersects the focal plane image of the objective 23 at the very same point that a ray (dotted line) parallel to the direction $A_1F_1$ and passing through the optical center $O_2$ of the same objective 23 will do. A ray passing through the optical center of a lens does not suffer any angular deviation. The point of intersection $A_2$ of the focal plane common to both light rays $O_2A_2$ and $IA_2$ becomes the image of the point $A_1$ intersection of the principal plane of the objective 18 by the ray $AA_1$ parallel to the general axis and emanating from the interference point A.

Thus, the two right triangles $O_1A_1F_1$ and $F_2O_2A_2$ are similar having the same angle $\beta$. They furnish the relationship, $$\frac{F_2A_2}{O_1A_1}=\frac{O_2F_2}{O_1F_1}=\frac{f_2}{f_1} \quad (1)$$

representing a fixed ratio of the image to the object dimensions.

Considering now the distance $p$ separating two consecutive interference bands $A_1$ and $B_1$ existing at the surface of the interference of the glass plate 19 and the distance $P_2$ separating the correlative images $A_2$ and $B_2$ produced by the objective 23 we obtain the equation:

$$\frac{P_2}{P}=\frac{f_2}{f_1}$$

yielding:

$$P_2=\frac{f_2}{f_1}\times P \quad (2)$$

The telescope objective 23 produces, at its focal plane image, an image of the fringe pattern which is homologous of the object interference pattern. The ratio of similitude remains, for a given instrument, equal to the ratio of the focal distances of the telescope objective and collimating objective.

Further, the differential of Equation 2 furnishes $$dp=\frac{f_1}{f_2}dp_2$$

indicating that the variations of the dimension of the image is linear with respect to the variation of the object dimension and vice versa.

On the other hand, from examination of FIGURE 1, the angle $\theta$ made by the two semi-reflecting surfaces of the two glass plates 20 and 19 can be expressed in terms of the half wave length of the interfering light and the distance $p$ between two consecutive bands.

This angle $\theta$ is given by:

$$\tan \theta = \frac{\lambda}{2p}$$

and more generally by $$\tan \theta = \frac{n\lambda}{2p_n} \qquad (3)$$

in which $n$ represents the number of bands included within the distance $p_n$ separating the band of order $m$ from the band of order $m+n$, and $\lambda$ is the wave length of the light.

The angle $\theta$ being very small, no appreciable error arises from the substitution of the angle in place of its tangent:

$$\theta \simeq \frac{n\lambda}{2p_n} \qquad (4)$$

The wave length $\lambda$ remains invariant while the angle $\theta$ varies inversely with the band distance $p_n$. Taking the differential of the angle function with respect to the only variable $p_n$ we obtain:

$$d\theta = -\frac{n\lambda}{2} \times \frac{dp_n}{p_n^2} \qquad (5)$$

The variation of distance $dp_n$, at the object plane, can be replaced by its corresponding variation $dp_{n2}$ at the image plane thus permitting the writing:

$$d\theta = -\frac{n\lambda}{2} \times \frac{1}{p_n^2} \times \frac{f_1}{f_2} \times dp_{n2} \qquad (6)$$

This last equation expresses the sensitivity of angle measurement $d\theta$ in terms of the sensitivity and precision of the measurement of the linear distance $dp_{n2}$ at the focal plane of the telescope objective.

The linear distance $dp_{n2}$ is known through the adjusting of the ocular micrometric reticle whose disposition and arrangement is shown in FIGURES 1 and 2.

In fact, the eye peering through the ocular sees an enlarged image $A_3B_3$ of the image $A_2B_2$, formed at the focal plane image of the telescope objective, superimposed onto the images of the crossed markings 35 engraved on the surface of the reticle plate 25. As indicated in FIGURE 1, the point image $A_3$ is formed by the intersection of the ray $A_3A_2O_3$ passing through the ocular optical center with the refracted emerging ray $A_3CF_3$, corresponding to the ray $A_2C$ parallel to the main axis and emanating from the point $A_2$. The same image construction applies to the markings 35 carried by the reticle 25, FIGURE 2. Basically, the image $A_3B_3$ is homologous to the object $A_2B_2$.

As a consequence, the interference bands $A_3A_3$, $B_3B_3$, etc., appear as horizontal black lines laying horizontally in the field of view. By rotation of the drum 29 keyed to the micrometric screw, one can bring one of the markings 35 to lay squarely astride one of the bands, as for instance, the marking 35 marked 9 which is centered on the interference fringe $B_3B_3$.

Figure 3:
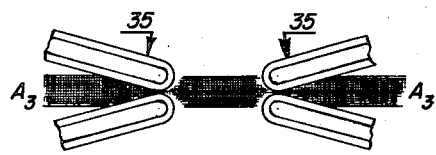
FIGURE 3 is a still further enlarged view showing the relation of one such sets of markings and a light interference band aligned therewith.

For instance, in the described arrangement (FIGURE 2) eleven markings 35 are used. The linear distance between consecutive markings remains constant, and thus, the distance between the marking No. 0 and the marking No. 10 represents exactly ten times the distance of each interval. To secure adequate accuracy, the markings 35 are traced with the help of a metrology dividing machine having a diamond cutter. The width of the tracing lines and their central arrangement, shown considerably enlarged in FIGURE 3, are such as to increase the definition of their position with respect to the crest line of the interference fringe making use of diffraction at the edges of the crossed lines. The discrimination obtained through this specific arrangement reaches easily ten times the normal discrimination prevailing when attempting to position a solid or a dotted reference line on the fringe crest.

The interval length between two adjacent markings 35 equals an exact multiple of the micrometric screw pitch. Thus, any displacement $\Delta y$ of the reticle markings resulting from a rotation of the micrometric screw becomes directly measurable in terms of the calibrated divisions carried by the drum 29 which divisions are entire subdivisions of the interval between two consecutive markings 35. For example, the drum carrying 100 equal divisions being associated to a 1/10 vernier yields readings in 1/1000 of a complete turn. Also, with the distance between two consecutive markings 35 corresponding to two turns of the micrometric screw, the sensitivity in $\Delta y$ displacement of the reticle becomes known to $$\Delta y = \frac{1}{2 \times 1000}$$

of the elementary interval.

Under those conditions, the position of the interference line $B_3B_3$, FIGURE 2, is read as, $$y = 9 + \frac{0.0750}{2} = 9.0375$$

But this measurable displacement $\Delta y$ being obtained at the focal plane of the telescope objective 23 represents also the measured displacement $dp_{n2}$ of the interference band, consecutive to a rotation $\Delta \theta$. Thus, when $p_n = 20$ millimeters, $f_1/f_2 = 2/1$, and $n=1$, while using the mercury green line $\lambda = 5461$ A, the angular resolving power reaches:

$$d\theta_1 = -\frac{5.461 \times 10^{-4}}{2} \times \frac{1}{400} \times \frac{2}{1} \times \frac{1}{2 \times 1000} = 6.825 \times 10^{-10} \qquad (7)$$

It is to be noted that one second of arc represents close to $5 \times 10^{-6}$. Thus, the method possesses a capability of nearly, $$d\theta_1 = \frac{6.825}{5} \times 10^{-4} = 1.36 \times 10^{-4} \text{ second of arc}$$

The exceedingly fine resolving power thus attained does not preclude the possibility of a sufficient range of angular variation $\Delta \theta$. As a matter of fact, the counting of as many as two hundred fringes included within the distance limited between the markings No. 0 and No. 10 does not offer any difficulty due to the sharpness of the fringes.

A count of two hundred fringes corresponds, for the distance $p_n = 20$ millimeters, to an angle $$\theta_{200} = \frac{200 \times 5.461 \times 10^{-4}}{2 \times 20} = 2.7305 \times 10^{-3} \qquad (8)$$

which appears as $$\frac{\theta_{200}}{d\theta_1} = \frac{2.7305 \times 10^{-3}}{6.825 \times 10^{-10}} = 4.00 \times 10^6$$

times the basic resolving power.

On the other hand, computing the relative sensitivity for any angle $\theta$ one obtains the basis relationship:

$$\frac{d\theta}{\theta} = -\frac{1}{f_2 p_n} \Delta y = -5 \times 10^{-5} \text{ for } \Delta y = \frac{1}{2000} \qquad (9)$$

The precision and sensitivity can be further enhanced since different monochromatic light sources or different wave lengths emitted by the same source can be selected to form different interference patterns leading to successive measurements of the same angle $\theta$ and its variations.

For instance, with a mercucy light source, the following wave lengths can be used:

$\lambda_1 = 5790$A., $\lambda_2 = 5770$A., $\lambda_3 = 5461A$.
$\lambda_4 = 4910$A., $\lambda_5 = 4358$A., $\lambda_6 = 4046$A.

Therefore, with the help of these six wave lengths, one arrives to the six simultaneous equations $$\theta = \frac{n_1 \lambda_1}{2 p_{n1}}, \quad \theta = \frac{n_2 \lambda_2}{2 p_{n2}}, \quad \theta = \frac{n_3 \lambda_3}{2 p_{n3}}$$

$$\theta = \frac{n_4 \lambda_4}{2 p_{n4}}, \quad \theta = \frac{n_5 \lambda_5}{2 p_{n5}}, \quad \theta = \frac{n_6 \lambda_6}{2 p_{n6}}$$

completed by the six differentials, $$d\theta_1 = -\frac{n_1 \lambda_1}{1} \times \frac{f_1}{f_2} \times \frac{1}{p_{n1}^2} \times \Delta y$$

$$d\theta_6 = -\frac{n_6 \lambda_6}{2} \times \frac{f_1}{f_2} \times \frac{1}{p_{n6}^2} \times \Delta y_6$$

These two systems permit computing the mean square deviation and its probability hense adding, as can be proved by straight-forward computation, another decimal place to both absolute sensitivity and relative sensitivity.

Naturally, the optical quality of the objectives 18 and 23 governs the final possible sensitivity of the arrangement. However, appropriate objectives can be designed and built to satisfy the physical conditions.

Since different light wave lengths may be advantageously used, mainly the six predominent mercury visible lines, the objectives are designed to satisfy the paraxial achromaticity for the following wave lengths: 5790 A.—5461 A. —4910 A. —4358 A. and 4046 A., five different glass elements are required. The chromatic aberrations are corrected for the marginal rays of the following wave lengths 5790 A. —4910 A. and 4046 A.

The spherical aberrations are corrected for three wave lengths equal or close to 5790 A. —4910 A. and 4046 A. for a marginal distance approximately $h=0.81$ of the maximum clear radius. A general construction of the objective along a pseudo-symmetrical gauss system with a cemented doublet ahead and cemented triplet in the back increases the luminosity of the system and permits further correction of the field planeity and orthoscopy. The two extreme surfaces are figured into aspherical surfaces for final correction of the spherical aberrations.

For the ocular 24, the classical design and construction of the wide angle high power ocular mounted on metrology instruments is preferred.

The high sensitivity and accuracy obtained through this method of angle measurement would be of no practical use if such small angular quantities could not be mechanically produced or adjusted. This is the purpose of the special construction shown in FIGURE 1. The frame 40, centered on the rotatable sleeve 41 supporting the light-polarizing member 21, can be locked at any angular position relative to the sleeve 41 by means of the knurled set screw 43. This mechanical locking permits approximate angular adjusting to within ±6 minutes of arc.

By a machine operation, the base 40 is provided with an integral, yet pressure-deformable arm 44 terminating in the glass plate holder 45 on one side and terminating in an elastically-deformable arm 46 on the other side. The arm 46, designed to form a solid of uniform elastic deformation, supports the two coiled springs 47 and 48 which encircle, respectively, the screws 49, 50 threaded securely into the base 40. Each of the springs is individually compressible by means of the knurled nuts 51, 52 and the pressure washers 53, 54. It will be noted that the screws 49 and 50 pass through clearance holes formed in the arm 46 and that these screws are each provided with a longitudinally extending slot. Pins 55, 56, disposed between the respectively cooperating knurled nuts and pressure washers, prevent rotation of the pressure washers during adjustment of the nuts.

The members are so designed and constructed that under full elastic deformation of the arm 46 the pressure-deformation of the arm 44 causes the glass plate support-ing arm 45 to rotate by some twenty to thirty minutes of arc.

The support 40, flexible arm 46 and rigid arm 45 constitute a high precision arrangement for positioning the interference pattern lines, as seen through the ocular of the telescope, in proper position relative to each other and at a proper spacing. After this has been done the entire assembly including the analyser 41 is rotated as a unit to a new angular position to effect the desired rotation of the plane of polarization of the light beam emerging from such analyser, and the new distance between the light fringe patterns is observed on the reticle 25. The extent of the linear adjustment of the reticle to reestablish the original relative orientation of fringe pattern is a measure of the angular rotation imparted to the analyser.

The purpose of the coil spring 47 is to increase the total traveling distance of the adjusting nut for a given deformation of the arm 46. The elastic deformation of the coil spring adds up to the elastic deformation of the arm. Hence, with a nut traveling a distance of 20 millimeters and a pitch of 0.50 mm. the rotation of the arm 45 can readily be adjusted to within, $$\Delta\theta_{s1} = 30' \times \frac{0.5}{20} \times 0.01 = 0.0075'$$

or $$\Delta\theta_{s1} = 0.45 \text{ second of arc}$$

The second screw 50, nut 52 and coil spring 48 assembly furnishes the fine adjustment required. Being located close to the deformable member 44, and the spring rate being selected such that for a total displacement of the nut 52 amounting to 20 millimeters, the rotation of supporting arm 45 reaches 1.5 second, a precision in adjustment of, $$\Delta\theta_{s2} = 1.5 \times \frac{0.5}{20} \times 0.01 = 0.375 \times 10^{-3}$$

second of arc is readily available. This value expressed in radians becomes $$\Delta\theta_{s2} = 1.875 \times 10^{-9}$$

for one hundredth of a turn of the nut 50. Without difficulty a fine knurled nut is easily set to 1/400 of a turn thus yielding a final positioning sensitivity of $$\Delta\theta_{s20} = 0.47 \times 10^{-9}$$

which is in all respects compatible to the optical resolving power of the system.

Fatigue, viscous drift, etc., impose limitations on the choice of the steel alloys entering into the making of the base 40 and of its machined arms 45, 44, 46 and also for the coil springs. A no-drift steel alloy, as now used in the manufacture of the elastic suspension of a seismograph, answers perfectly well those last requirements.

The described type of mechanical adjustment does not involve any bearing, back lash, or friction, only elastic deformations within practical and safe loading characteristics.

The interferometric system, as above described, cannot be affected by play or clearance in the bearing supporting the sleeve carrying the light-polarizer 21. Linear displacements cause only a whole translation of the fringe patterns without affecting their spacing; only relative rotation influences the distance between such interference fringes.

At this point it will be pointed out that the light-polarizing member 21 is shown in the drawing particularly because the angle measuring system is uniquely suited for the measurement of minute angles in the art of polarimetry wherein it is necessary to measure the extent of angular rotation of the plane of polarization of a polarized light beam traversing a solution under test. In such particular application, as described in my co-pending patent application Serial No. 690,395, filed October 15, 1957, it is highly desirable to measure the angular rotation of a light-polarizing member with a precision of the order of a fraction of a second of arc. Such polarizing member is shown in FIGURE 1 of the present application and is identified by the reference numeral 21 and the angular rotation thereof is identified by the angle Δθ. It will be apparent, however, that the apparatus described hereinabove is not limited to use in a polarimeter but rather is adapted for application in any field wherein there is a requirement for measuring very minute angular deflections with a high degree of precision as, for example, in testing the response accuracy of synchros.

In polarimetric apparatus of the character disclosed in my above-referenced co-pending application, the operator, during manipulation of the apparatus is required to read the magnitudes of two electric currents developed by suitable light transducers. Additionally, when such apparatus is equipped with the angle measuring system herein described, the operator must also maintain a close watch on the fringe patterns appearing on the microscope reticle. In order to facilitate such tasks of the operator, I incorporate into the system of FIGURE 1 an electro-optical arrangement now to be described.

The movable coil 60 of a D.C. measuring instrument (such as a microammeter, or suspension galvanometer) carrier a reflecting mirror 61. Although not shown in the drawings, those skilled in this art will understand that the movable coil rotates in a magnetic flux field generated by a permanent magnet and that the angular extent of such coil rotation varies in correspondence with the magnitude of a uni-directional current flowing through the coil. Light from a suitable source 70 is directed onto the mirror 61 through a lens 71. Interposed in the light beam is a wire w stretched between suitable supports such that a real image w' of the wire is formed. In normal practice, the magnitude of the current flowing in the rotatable coil 60 can be measured by noting the angular deflection of the image w' along an arcuate, calibrated scale, which scale has a radius coinciding with the axis of rotation of the coil. In the present case, however, the mirror 61 reflects a real image into the optical system through a total reflection prism 62 inclined at an angle of 45 degrees to the axis of a Dove or Wollaston prism 63. Such arrangement transforms the horizontal rotation of the galvanometer light beam into a vertical one whereby the real image of the wire W is horizontal and at the focal plane of the telescope objective 23. Thus, the position of the image can be noted relative to a suitably-calibrated scale engraved on a glass plate and also positioned at the focal plane of the objective 23.

By way of further explanation of this feature of the invention, reference is made to FIGURE 2 showing the total reflection prism 62 and the prism 63 associated with the reticle 25. A glass plate 64, carrying horizontal graduations −20, −10, 0, +10, +20, is disposed beyond the prism 63 and in the plane of the reticle 25. The image of the wire reflected by the galvanometer mirror is identified by the letter W' and it will be apparent that if the scale on the glass 64 is calibrated in micro-amperes, such position of the image W' indicates that a current of 3.5 microamperes is flowing in the galvanometer.

As is also indicated in FIGURE 2, a second galvanometer and prism arrangement may be incorporated into the system for the measurement of a second electric current, the corresponding prisms, scale plate and wire image being denoted by primed reference characters, specifically, 62', 63', 64' and W''. With the two scales 64, 64' located one on each side of the normal clear field of view, it is quite easy for the operator to read the two current values while, at the same time, observing the fringe patterns on the reticle. This arrangement offers an appreciable advantage. The linear displacement of the galvanometer movable coil, proportional to the current, is greatly magnified by the high power, wide field ocular. A normal linear magnification of 10 to 1 increases by the same factor the effective sensitivity of the galvanometer.

Having now described the invention in detail, those skilled in this art will find no difficulty in making desired or required changes and modifications in the illustrated components and their relative, operative assembly. Such changes and modifications may be made without departing from the spirit and scope of the invention as set forth in the following claims.

I claim:

1. In an interferometer of the type including a pair of light-permeable members spaced along the axis of a monochromatic light beam, the combination of a rotatable member rotatable about a fixed axis lying on the said light beam axis and normal thereto; rigid supporting means comprising a base portion integrally joined by a non-flexible, elastically-deformable portion to an extending arm that carries one of the light-permeable members; means adjustably securing the supporting means to the rotatable member; and adjustable means for deforming the said elastically-deformable portion independently of the rotatable member thereby to alter the relative planar disposition of the light-permeable members.

2. The invention as recited in claim 1, wherein the adjustable means for deforming the elastically-deformable portion includes a second extending arm integral with the said elastically-deformable portion and spaced from said base portion, and spring means normally biasing the said second arm in a predetermined direction relative to the said base portion.

3. An interferometer of the type having a pair of light-permeable members spaced along the axis of a parallel monochromatic light beam a distance equal to a multiple of half the wave length of the monochromatic light, characterized in that the light entrance surface of the first light-permeable member is coated with a quarter wave length anti-reflecting coating and lies in a plane forming a small angle with respect to the light-exit surface, and the second light-permeable member is black and having a light-entrance surface which is coated with a 50 percent light-reflecting coating.

4. In an interferometer of the type including a pair of light-permeable plates spaced along the axis of a monochromatic light beam a distance equal to a multiple of half the wave length of the light beam, the combination of a unitary supporting member having a rigid base portion and a pressure-deflectable portion terminating in a first arm spaced from and substantially parallel to the base portion and a second arm; means securing one of the light-permeable plates to the said second arm; a threaded member passing through a clearance hole formed in the said first arm and threaded into the said base portion, a threaded nut on said threaded member, and a spring encircling the said threaded member and disposed between the said nut and the said first arm.

5. The invention as recited in claim 4 including means to secure the said supporting member to a rotatable member having an axis of rotation in alignment with the axis of the light beam and normal thereto.

6. Apparatus for measuring the angular rotation of a rotatable member comprising means forming a monochromatic punctual light source at the focal plane of an objective leans having a fixed axis; a first light-permeable member centered on the axis of the objective lens and receiving light rays emerging from said objective lens; a second light-permeable member centered on the axis of the objective lens and receiving light rays emerging from said first member, said second member being spaced from the first member a distance equal to a multiple of half the wave length of the monochromatic light; means adapted for mechanically coupling the said second light-permeable member to the rotatable member such that the axis of rotation of the rotatable member is normal to the axis of the light rays emerging from the said objective lens; a telescope having an objective lens and an ocular lens lying on the axis of the said light rays, said ocular lens being adjusted for observation at infinity; a reticle disposed in a plane normal to the light rays and located substantially at the focal plane of the ocular; calibrated markings carried by the reticle; and calibrated means adjustable to move the reticle in a plane normal to the axis of the light rays.

7. The invention as recited in claim 6, wherein the light-entrance surface of the said first light-permeable member is coated with a quarter wave length anti-reflecting coating and lies in a plane forming a small angle with respect to the light-exit surface.

8. The invention as recited in claim 7, wherein the said second light-permeable member is black glass the light-entrance surface of which is covered with a 50 percent light-reflecting coating.

9. The invention as recited in claim 7, wherein the said second light-permeable member consists of a quartz plate overlying a plate of black glass.

10. The invention as recited in claim 6, wherein the said second light-permeable member is black glass and the light-reflecting surfaces of both said light-permeable members are coated with a coating reflecting approximately 50 percent of the light energy impinging on such surfaces.

11. The invention as recited in claim 6, wherein the means adapted for mechanically coupling the second light-permeable member to the rotatable member comprises a first arm carrying said second light-permeable member a second arm and a pressure-deformable member integrally joining the first and second arm to a rigid base portion, means to secure the rigid base portion to the rotatable member, and adjustable means to deflect the said pressure-deflectable member a predetermined amount.

12. Apparatus as recited in claim 6, in combination with a current-responsive device having a rotatable coil carrying a mirror, a light source, a transparent member carrying calibrated markings and disposed substantially in the plane of the reticle, means directing light from said source onto the mirror, a fixed filament disposed in the light beam between the said source and mirror, and optical means directing light reflected from the said mirror onto the said transparent plate.

References Cited in the file of this patent

UNITED STATES PATENTS

| | | |
|---|---|---|
| 730,016 | Hein | June 2, 1903 |
| 2,410,502 | Hurley | Nov. 5, 1946 |
| 2,450,839 | Merritt | Oct. 5, 1948 |
| 2,464,521 | McCall | Mar. 15, 1949 |
| 2,565,782 | Rhodes | Aug. 28, 1951 |
| 2,604,004 | Root | July 22, 1952 |
| 2,617,618 | Blume | Nov. 11, 1952 |
| 2,795,991 | Tuzi | June 18, 1957 |
| 2,830,488 | Agnew | Apr. 15, 1958 |
| 2,880,644 | Brockway et al. | Apr. 7, 1958 |

UNITED STATES PATENT OFFICE

CERTIFICATE OF CORRECTION

Patent No. 2,993,404            July 25, 1961

Auguste Louis Marie Antoine Rouy

It is hereby certified that error appears in the above numbered patent requiring correction and that the said Letters Patent should read as corrected below.

Column 1, line 23, for "tent of the plane of polarization of rotation of a polarized" read -- tent of rotation of the plane of polarization of a polarized --; column 7, lines 11 to 13, for that portion of the formula reading $$\frac{1}{pn1^2} \quad\quad \text{read} \quad\quad \frac{1}{p^2 n1}$$

sane column 7, lines 14 to 16, for that portion of the formula reading $$\frac{1}{pn6^2} \quad\quad \text{read} \quad\quad \frac{1}{p^2 n6}$$

Signed and sealed this 2nd day of January 1962.

(SEAL)
Attest:
ERNEST W. SWIDER
Attesting Officer

DAVID L. LADD
Commissioner of Patents